Feb. 17, 1970  V. GUARNASCHELLI  3,495,578
POSITIVE CRANKCASE VENTILATING DEVICES
Filed May 2, 1968  4 Sheets-Sheet 1
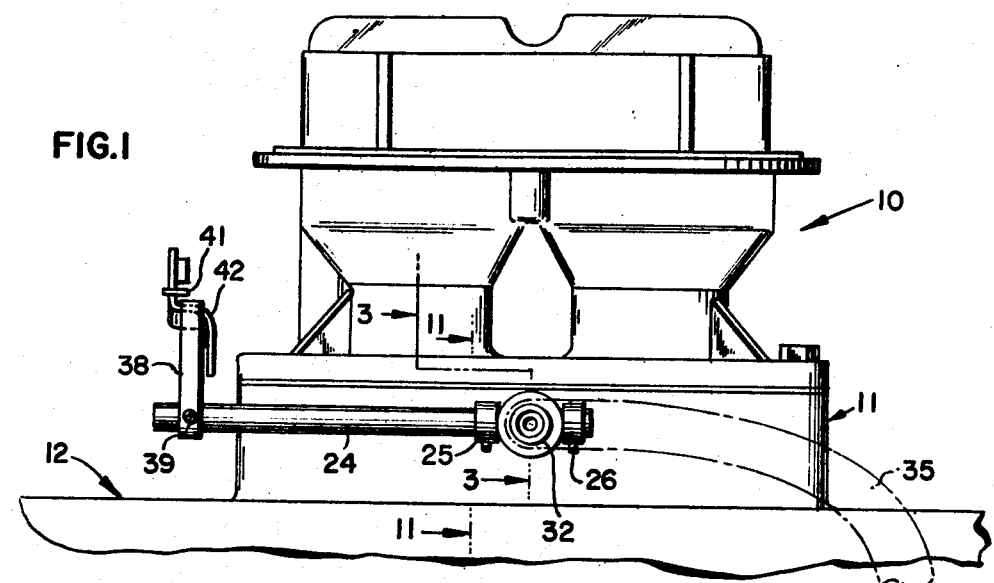
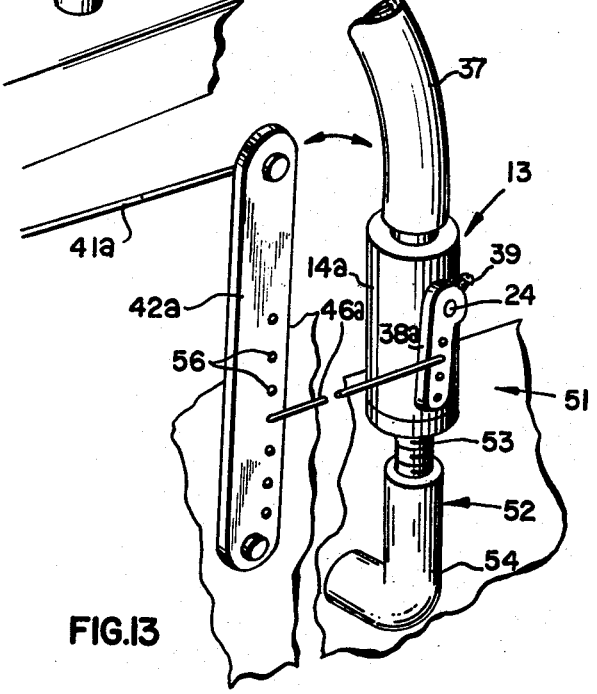
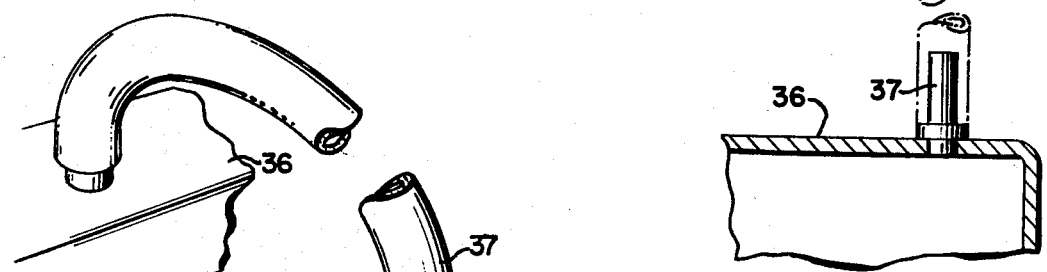
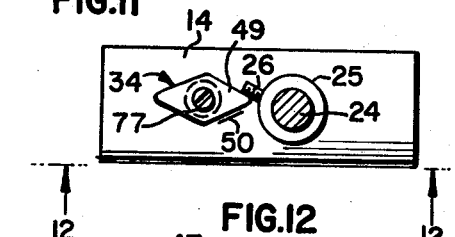
INVENTOR.
VINCENT GUARNASCHELLI
BY
*F. Ledermann*
ATTORNEY

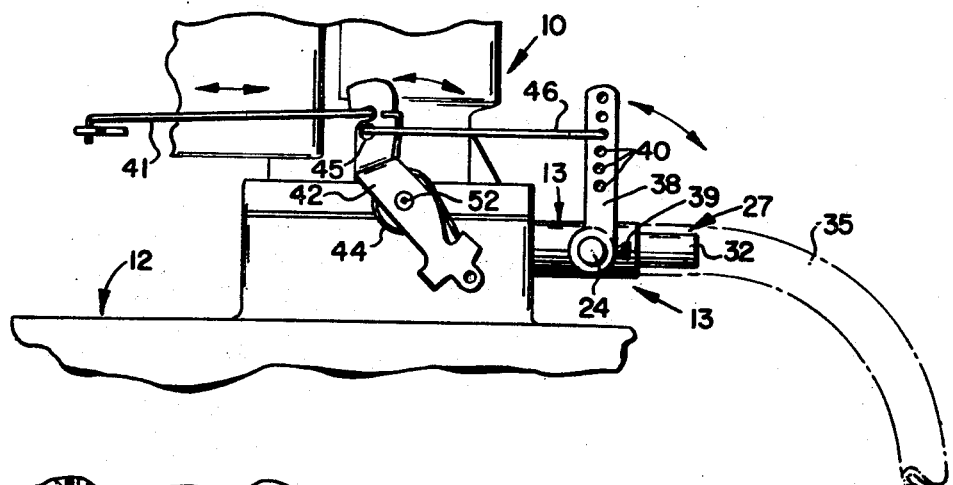
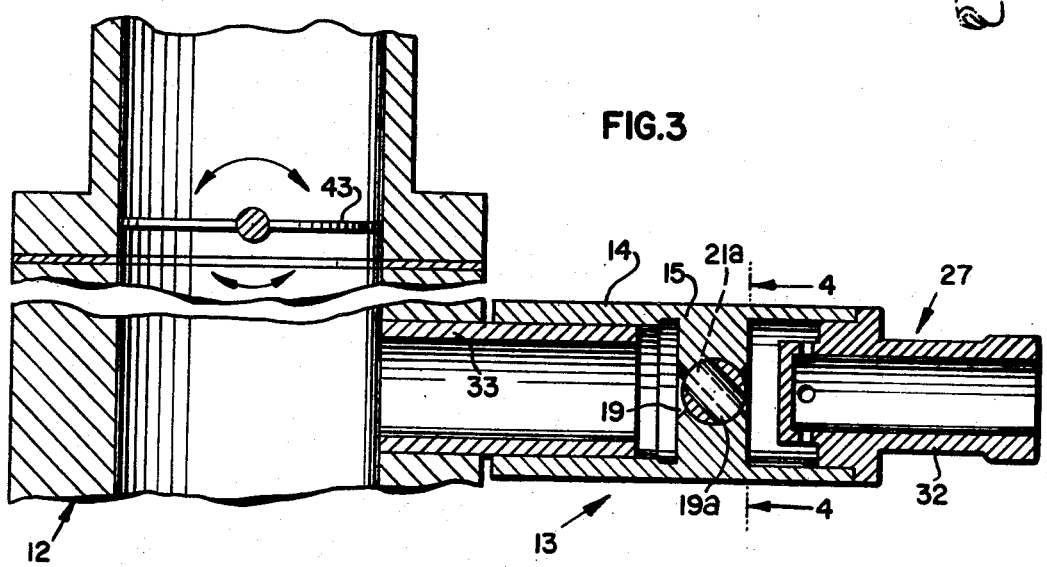
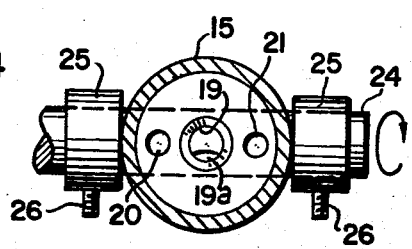

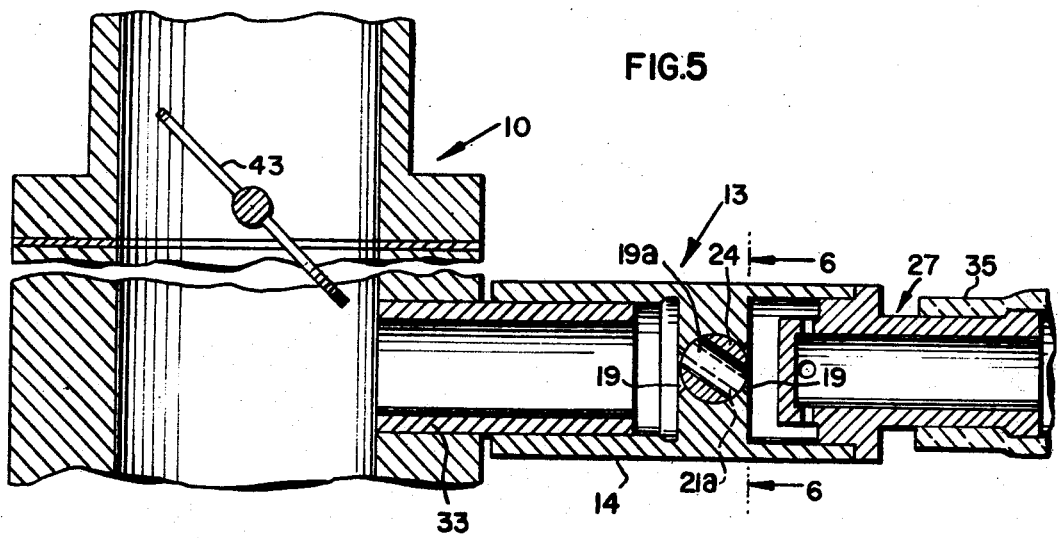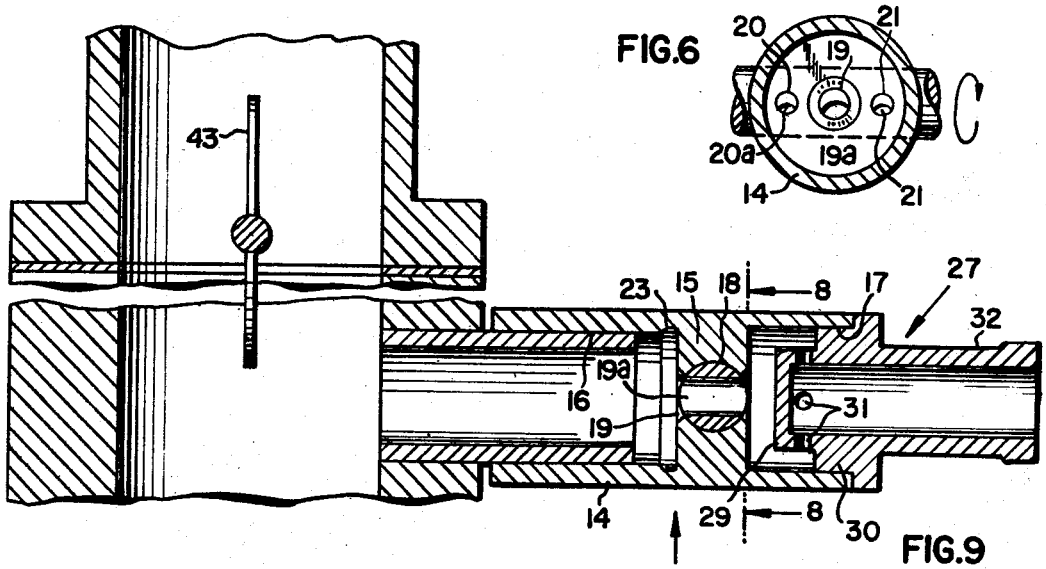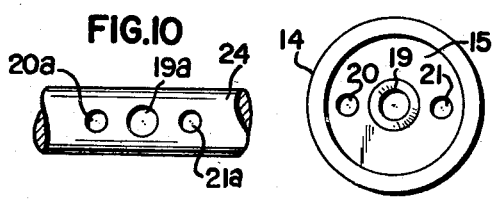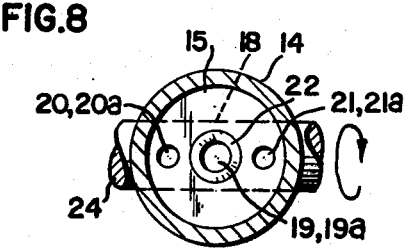

Feb. 17, 1970  V. GUARNASCHELLI  3,495,578
POSITIVE CRANKCASE VENTILATING DEVICES
Filed May 2, 1968  4 Sheets-Sheet 4

INVENTOR.
VINCENT GUARNASCHELLI
BY
*F. Ledermann*
ATTORNEY

United States Patent Office 3,495,578
Patented Feb. 17, 1970

---

3,495,578
POSITIVE CRANKCASE VENTILATING DEVICES
Vincent Guarnaschelli, Greenlawn, N.Y., assignor to The Nycal Company, Inc., Carlstadt, N.J., a corporation of New Jersey
Filed May 2, 1968, Ser. No. 726,109
Int. Cl. F02m 7/00, 7/22; F02b 33/00
U.S. Cl. 123—119     6 Claims

ABSTRACT OF THE DISCLOSURE

Connected into the downdraft side of the carburetor at one end and into the valve cover (or crankcase) at the other end, an adjustable flow control valve operatively connected to the accelerator pedal linkage or mechanism which controls the degree of opening of the butterfly, or engine throttle. The valve has a range between minimum and maximum flow positions, and is adjusted to provide for minimum flow when the throttle is at its minimum open position, as at idling of the engine, and for maximum flow when the throttle is wide open at its maximum position.

SUMMARY OF THE INVENTION

The problem which needs to be solved to eliminate the escape of crankcase fumes, hereinafter termed "blow-by," into the atmosphere, is the feeding of such into the intake manifold at the rate at which they are formed. The rate of formation of blow-by is at a minimum when the intake suction is at its maximum, which is the condition at idling speed of the engine. The rate of formation of blow-by increases with increase of engine speed and is at its highest at maximum engine speed. But intake suction decreases with increase of engine speed; hence it is necessary that means be provided to feed the blow-by into the intake at a minimum rate at idling speed and increase the rate of such feeding substantially proportionally as engine speed increases. This is accomplished by the instant invention. Moreover, not only may the crankcase be sealed from the atmosphere with the present invention, but it must be sealed. For the sake of safety in the case of an unforeseeable condition in which undue pressure may be built up in the crankcase, however, a relief or safety valve may be installed on the crankcase; an example of such a valve is disclosed in my copending application Ser. No. 683,534, filed Nov. 16, 1967.

In the case of a new engine, it is well known that blow-by may even be entirely absent for a time at idling speed. The instant flow control valve is adjustable so that its minimum flow position for a new engine may even be set at zero opening for idling speed whence the valve will only start to open only after an increase of speed. It is also possible to adjust the maximum opening of the valve to a position below the maximum permissible by the valve.

Conduit means in the form of a pipe, a hose, or the like connects the instant valve between the downdraft side of the carburetor, or the intake manifold, and the valve cover or its equivalent, the crankcase. The negative pressure or vacuum in the intake manifold at idling speed is generally as high as sixteen to eighteen inches of mercury. With nothing but a hose connecting the intake with the valve cover, such high vacuum applied to the crankcase may have disastrous consequences. In the case of the instant valve, it is in general set at a minimum opening for idling speed which opening reduces the intake suction applied to the crankcase to about one-half inch of mercury. This vacuum is sufficient to suck in all the blow-by formed during idling at the rate of its formation. As the engine speeds up and the intake suction decreases, the valve opens increasingly wider. Thus with decreasing intake suction and increasingly wider opening of the valve, an increasing rate of volume flow of blow-by into the intake manifold is attained. At maximum engine speed the intake suction is close to zero while the valve is at the same time open to its maximum flow position. Hence at all engine speeds throughout the range thereof blow-by is fed into the intake manifold at the rate at which it forms, so that pressure cannot build up in the crankcase.

DESCRIPTION OF THE INVENTION

Referring briefly to the accompanying drawings, FIG. 1 is a fragmentary front elevational view of a portion of an internal combustion engine, showing in part the engine carburetor and the valve cover of the crankcase as well as the intake manifold, with an embodiment of the present invention installed, with parts broken away and parts omitted.

FIG. 2 is a fragmentary side elevational view of the same.

FIG. 3 is a fragmentary sectional view taken on the line 3—3 of FIG. 1, showing the valve in idling position.

FIG. 4 is a fragmentary sectional view taken on the line 4—4 of FIG. 3.

FIG. 5 is a sectional view similar to FIG. 3 but showing the valve open above the minimum idling degree at increased engine speed.

FIG. 6 is a fragmentary sectional view taken on the line 6—6 of FIG. 5.

FIG. 7 is a sectional view similar to FIG. 3 but showing the valve open to its maximum possible degree, as, for example, at maximum engine speed.

FIG. 8 is a section taken on the line 8—8 of FIG. 7.

FIG. 9 is an end view of the housing of the device.

FIG. 10 is a fragmentary view of the valve stem, per se.

FIG. 11 is a fragmentary section, equivalent to a section taken on the line 11—11 of FIG. 1 but showing in addition an adjustable means for varying the starting setting of the valve for the engine when idling.

FIG. 12 is a fragmentary view taken on the line 12—12 of FIG. 11.

FIG. 13 is a fragmentary perspective view, with parts broken away and parts omitted, showing a different way in which the device may be positioned.

Figure 14:
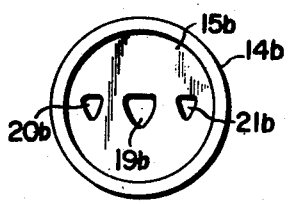
FIGS. 14 and 15 are views similar to FIGS. 9 and 10, respectively, showing a modified structure.

Referring in detail to the drawings, the numeral 10 designates a carburetor which is shown, merely by way of example, in FIG. 1, as a two-barrel type, the downdraft or downstream side 11 of which feeds into the intake manifold 12. Only sufficient parts of the engine structure are shown as are deemed necessary to illustrate the invention.

An embodiment of the flow control means or valve of the present invention is shown generally at 13 consisting of a cylindrical housing 14 open at both ends but having a wall or partition 15 between the ends thereof. The diameter of the chamber 16 at the end nearest the intake manifold, which end will hereinafter be referred to as the rear end, or outlet, is shown smaller than that of the chamber 17 at the front end, or inlet. Along a diameter of the housing passing through the partition 15 is a continuous cylindrical bore 18 extending through both the housing wall and the partition. The partition is shown having three pairs of opposed or mutually aligned holes 19, 20 and 21 extending transversely with respect to and through opposite sides of the partition into the bore 18. The middle holes 19 are shown of larger diameter than the holes 20 and 21, and they are preferably countersunk, as shown, and of course the smaller holes may also be countersunk, not shown. Preferably, a circumferential groove or gouge 23 is provided in the chamber 16 on the rear side of the partition.

Rotatably mounted in the bore 18 is a cylindrical valve stem 24 provided with spaced passages 19a, 20a and 21a. The middle passage 19a has the same diameter as the holes 19, and the passages 20a and 21a have the same diameter as the holes 20 and 21, respectively. In the drawings the holes 20 and 21 are shown having mutually identical diameters which are smaller than that of the holes 19. The spacing between the pairs of holes is the same as that between the passages so that the passages may, upon rotation of the stem, be aligned in part or wholly with their associated holes depending upon the degree of rotation of the stem.

In a test specimen of the device wherein the holes and passages were arranged as just described, and which has performed satisfactorily, the diameter of the middle holes 19 and the middle passage 19a is 0.200 inch and the diameter of the smaller holes 20, and 21 and their associated passages 20a, 21a is 0.155 inch. The exact dimensions of the holes and their passages as well as their relative positioning in a rotational (clockwise, FIG. 2) direction as shown and described, are of course subject to change, as will become apparent below. A feature of the valve as disclosed herein is that generally the larger middle holes 19 are so positioned that they are in partial alignment with their associated middle passage 19a before the smaller holes 20, 21 become partially aligned with their associated passages 20a, 21a as the stem 24 turns in the above-mentioned rotational direction, which may also be termed the forward direction. Or, more specifically, the essential feature of the device is that the through passage through the valve be enlarged progressively as the engine throttle opens wider with consequent increase of engine speed.

To confine the stem 24 against longitudinal movement so that the holes and their associated passages at all times lie in common planes transverse to the stem, the stem means, exemplified by two collars 25, locked on the stem as, for example, by setscrews 26.

In order to provide protection against backfire reaching the crankcase, instead of merely providing a pipe or hose nipple on the front end of the housing 14, a hollow plug 27, having its outer end shaped into a nipple 32, is fitted into the housing inlet. It is shown having a body 30 which may be force fitted into position, or otherwise attached, and an inner reduced extension 28 closed by a wall 29. The plug is so dimensioned that the wall 29 is spaced a distance from the partition 15. A plurality of circumferentially spaced openings are provided, at 31, in the circumferential wall of the extension 28, communicating with the nipple passage.

In an installation such as is illustrated in FIG. 1, the device is connected as follows. Multiple barrel carburetors are usually provided with a stub pipe or tube 33 extending from the downdraft side of the carburetor, or, what amounts to the same thing, the intake manifold 12 is provided with such a pipe. The chamber 16 of the housing 14 is dimensioned to register about the pipe; obviously suitable leak-proofing means, not shown, may be employed, and any suitable additional means, not shown, may be used to secure the housing firmly in place. A hose 35 has one end connected into the valve cover 36 of the engine through the medium of a suitable connector 37, and the other end attached to the nipple 32.

A lever arm 38 is secured to the stem 24, as by means of a set screw 39. This arm is preferably provided with a plurality of longitudinally spaced openings 40. In order to illustrate the operation of the valve, only a portion of the mechanism operated by the accelerator pedal of an automobile is shown in the form of a rod or link 41 secured to a rocker 42 pivoted at 52 for rotation of the carburetor butterfly 43. The rocker is normally biased by a spring 44, shown only in FIG. 2, to maintain the butterfly in its minimum open or idling position. The rocker 42 has an opening 45 therein. The arm 38 is hooked up to the rocker 42 by connecting one end of a link 46 in the opening 45 and the other end in one of the openings 40 in the arm.

The hook-up is normally so made that, with the butterfly in idling position, exemplified in FIG. 3, the stem 24 is in the position thereof shown in FIGS. 3 and 4, that is, with only a small or minimum degree of alignment between the holes 19 and the passage 19a while the holes 20 and 21 are blocked by solid portions of the stem. As the accelerator pedal is pressed down to cause the rocker 42 to swing through an angle clockwise, FIG. 2, the stem 24 turns through a corresponding angle. An in-between position of the butterfly and of the stem with relation to the holes in the partition, are shown in FIGS. 5 and 6. Here it will be noted that the degree of alignment of the holes 19, with the passage 19a has been increased and simultaneously partial alignment of the holes 20, 21 with their passages 20a, 21a has been attained. Consequently, although the suction of the intake has been decreased, enlargement of the total cross-sectional area of the htruogh passage through the valve permits the reduced intake suction to suck a considerably enlarged volume of blow-by.

Finally, when the accelerator is in fully pressed down position for maximum engine speed, FIG. 7, all the holes 19, 20 and 21 are in full alignment with their respective passages 19a, 20a and 21a, whence, with intake suction at a minimum, the wide open through passage through the valve permits the maximum amount of blow-by to be sucked into the intake manifold.

In general for many engines, the maximum suction at the intake manifold may be as high as sixteen to eighteen inches of mercury at idling speed. The minimum flow position for an idling engine, illustrated in FIG. 3 and FIG. 4, limits the through passage through the valve to the degree of alignment between the holes 19 and the passage 19a. In practice, this minimum through passage is set, with the aid of a vacuum meter, so that the suction applied to the valve cover is reduced to about one-half inch of mercury. As the stem continues to be turned by the butterfly rocker 42, the smaller holes 20, 21 become first partly and then more fully aligned with their associated passages, while at the same time the larger holes 19 also increase their alignment with their passage 19a. Throughout the range of speed of the engine from idling to maximum, a vacuum gage or meter has shown that the suction at the engine valve cover remains substantially constant at the same one-half inch of mercury. This constant suction at all speeds contrasts with the changing suction at the intake manifold, which, starting, say, at sixteen inches of mercury at idling, rapidly falls with increasing engine speed and at top speed approaches zero, whereas the formation of blow-by varies from a minimum at idling to a maximum at top speed. Thus the increasing cross-sectional area of the through passage through the valve, with its maintenance of one-half inch of vacuum throughout, compensates at all engine speeds for the increasing formation of blow-by.

Shown only in FIGS. 11 and 12 is a means for varying the starting position of the valve stem 24 for an idling engine. This is shown as a finger 34 rotatably mounted on a screw 47 screwed into the outer wall of the housing 14 and spaced from the latter by a spacer collar or washer 48. The tip 49 of the finger projects into the orbit or path of the outer end of the setscrew 26 on the adjacent collar 25. Assuming that the relative positions of the finger 34 and the screw 26 in FIG. 11 is the proper setting for attaining minimum flow through the valve, then such through passage may be reduced, by loosening the screw, swinging the finger clockwise, FIG. 11, and locking it in the new reduced passage which, it is further assumed, is the proper size for, say, a new engine. Conversely, the minimum through passage may be increased in an obvious manner, to apply the valve to an old or worn engine. A line 50 or other mark may be cut into or marked on the housing on one side of the finger 34 to indicate the zero through passage through the valve, that is, the position of the stem wherein all the holes in the partition are completely disaligned from the passages in the stem. Thus, in the case of a new engine the starting position may be at that line or mark. Similarly, a wide-open through passage setting likewise may be marked, as well as in-between sizes of the through passage, all not shown.

The construction of the inner end 28 of the plug 27, as described above, serves to prevent backfire from entering the hose 35 or, rather, flaming backfire. Assuming that a cylinder backfires, the flaming backfire which may get through the partition and stem expands in the chamber space between the partition and the plug body 30, where it is deflected into and through the holes 31 into the nipple. However, in taking this course, the flame by deflection and heat-absorption or transference to the metallic parts of the device, is rapidly quenched and cooled. The wall 29 provides a block in the path of the backfire and prevents the flame from entering the hose nipple 32. Since a suction stroke almost instantaneously follows a backfire stroke, the quenched backfire gases are immediately sucked back into the intake manifold. Heat radiating vanes, not shown, may of course be applied outside the housing 14.

Assuming that the holes 19, 20 and 21 and their associated passages 19a, 20a and 21a are all made of sufficiently large diameter, their maximum open position may be set at less than the maximum or full alignment shown in FIG. 8, when such is desirable for a given engine, or for an engine of a given displacement.

The series of openings 40 in the arm 38, FIG. 2, permits of altering the relationship between the angular range of the arm 38 with respect to the fixed angular range of the rocker 42. If the link 46 were connected into, say, the lowermost opening 40, owing to the fixed length of the link the stem 24 would be turned through an angle counterclockwise, FIG. 2. This can be compensated for by loosening the screw 39 and turning the stem through the requisite reverse angle, in order to restore the valve to its desired size of through passage for the idling engine, and relocking the arm in the new position. If the link were engaged in an opening 40 higher than shown in FIG. 2, the arm 38 would turn through an angle smaller than with the connection shown while the rocker 42 is turning between the minimum throttle and maximum throttle positions, assuming that the fixed position of the arm on the stem has not been altered. In the latter case the minimum starting through passage will be larger and the maximum through passage condition will be attained close to but prior to the maximum speed of the engine. Contrariwise, with the link 46 engaged in a hole below that shown in FIG. 2, without changing the relative positions of the stem and the arm, the angular movement of the arm will be greater than that of the rocker but the minimum starting position will be advanced to open a minimum through passage only after the engine speed has increased above idling, as for a new engine, and the maximum through passage attainable will be less than the maximum available through the valve, since the holes and passages will not become fully aligned when the rocker has fully opened the throttle.

It is to be noted that, with the provision of the larger through passage provided by the cylindrical holes 19 and the passage 19a, as the arm 38 turns the stem 24 progressively as the butterfly opens, the said through passage increases in area to a greater or less degree exponentially with respect to the angle through which the stem turns. For with the minimum starting position shown in FIG. 4, the through passage has a given area. When the stem is turned through an angle of, say, five degrees from the position shown, the area will be increased a given amount. But when the stem has turned through an additional five degrees, the cross sectional area of the passage is not merely doubled but rather is approximately quadrupled. Also, as the stem turns further and the two smaller holes begin to become aligned with their passages, the through passage through the valve is also increased further and exponentially with respect to the degree of turning. This is the desired condition, for it is well known that the rate of fuel mixture feed through the carburetor increases exponentially with respect to the angular movement of the butterfly in opening wider. For this reason it may be desirable to provide even an additional pair of small holes and passages so positioned that they enter into partial alignment after the two holes 20, 21 have become, say, positioned as shown in FIG. 6.

In the installation shown in FIG. 2, the housing 14 is mounted substantially horizontally and is attached directly to the intake pipe 33. In the case of some engines, particularly six-cylinder engines which use a single barrel carburetor, it is preferable to mount the housing in a non-horizontal, preferably upright, position. FIG. 13 illustrates fragmentarily the housing 14a, equivalent to the housing 14, mounted upright, and for this purpose the downstream side of the carburetor, or the intake manifold, shown at 51, is provided with a threaded hole in which an elbow fitting 52 is screwed. The rear end of the housing is then provided with a threaded nipple 53 which screws into the upstanding leg 54 of the fitting. The arm 38a, equivalent to the arm 38, here extends downward from the stem 24 and it is connected by a link 46a with a rocker 42a which operates the butterfly and is rocked by a link 41a actuated by the accelerator pedal mechanism, not shown. The setting of the starting position for the valve at idling of the engine is achieved in an obvious manner, by properly positioning the arm 38a with respect to the stem 24.

In all cases the relative positions of the holes 19, 20 and 21 with respect to the passages 19a, 20a and 21a, respectively, are set to reduce the intake vacuum at the crankcase to substantially one-half inch of mercury for the idling engine, and with such setting the vacuum at the crankcase remains substantially the same one-half inch of mercury throughout the speed range of the engine. Thus the valve provides for evacuation into the intake manifold of all the blow-by which reaches the crankcase at all engine speeds, thus eliminating the need for a vent into the atmosphere in the crankcase, which vent is permanently open as is the common practice. Such continuous evacuation of all blow-by formed at all speeds prevents pressure from building up in the sealed crankcase.

It is to be noted that as a result of the complementary cylindrical conformations of the bore 18 and the stem 24, the valve is self-cleaning owing to the wiping action between the stem and the surface of the bore.

Figure 15:
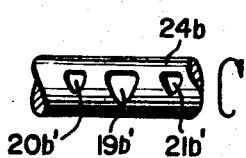

It is also to be noted that the holes in the partition 15 and their associated passages in the stem 24, need not necessarily be cylindrical, as shown, nor need the number of the holes and passages be limited, either to three, as shown, or to any smaller or greater number. An example of non-cylindrical holes in the partition and passages in the stem is illustrated in FIGS. 14 and 15. Here the housing 14b has in its partition 15b pairs of holes 19b, 20b and 21b, equivalent to the previously described pairs of holes in the partition 15 of the housing 14; the holes in FIG. 14 are shown substantially or approximately triangular in cross-section or outline, with their bases (upper lines or sides, FIG. 14) all in a line. The passages 19b', 20b' and 21b', FIG. 15, in the stem 24b, have the same approximately triangular cross sections, and the upper sides of the triangles are also all in a line parallel with the axis of the stem, as are those of the said holes in the partition 15b. It is obvious that, as the stem 24b turns clockwise, as did the stem 24 before, the middle passage 19b' first partly aligns with the middle holes 19b, and continued turning of the stem first brings the lower tips of the holes 20b, 21b into partial alignment with the passages 20b', 21b' while the degree of alignment of the holes 19b with the passage 19b' continues to increase. As before, upon maximum turning of the stem 24b all of the holes and passages are in full alignment.

The essential requirement of the flow control valve is that it open wider substantially in proportion to the increase of flow of fuel mixture through the carburetor with consequent increase of engine speed, reduction of intake vacuum and increased production of blow-by. To assure proper positioning of the stem with respect to the bore 18 for a minimum flow position at idling on installing the device, a vacuum gage applied to the inlet of the housing or to the hose 35 should read one-half inch of mercury, or close thereto, while the warmed-up engine is idling. In the case of a new engine the starting position of the valve may be set at zero so that the minimum flow begins only after the engine has been sped up somewhat above idling speed. Moreover, in such case, where the starting position is zero, it is equivalent to call zero the minimum flow position.

Figure 16:
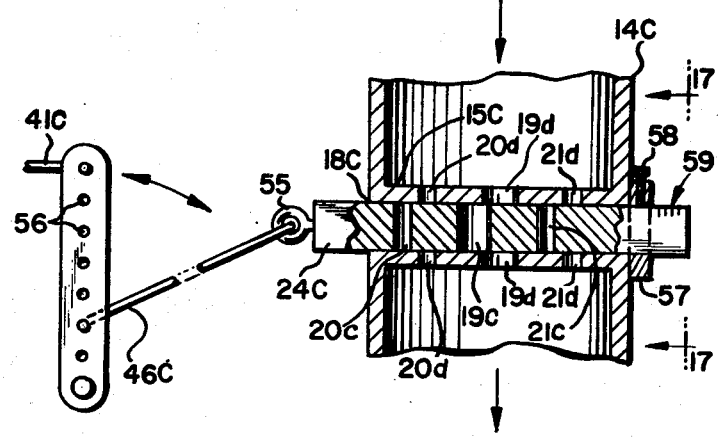
FIG. 16 is an enlarged fragmentary longitudinal section through the housing and bore of a further modified structure.
Figure 17:
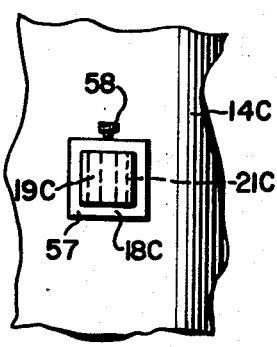
FIG. 17 is a fragmentary view taken on line 17—17 of FIG. 16.
Figure 18:
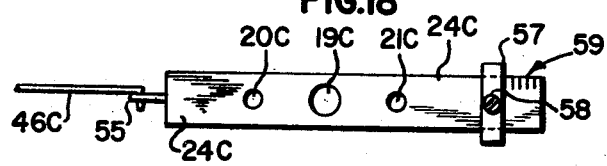
FIG. 18 is a top plan view of the stem per se of FIG. 16.

FIGS. 16, 17 and 18 illustrate a modified form of the invention which achieves the same results. Therein the bore 18c through the housing 14c and the partition 15c is non-circular in cross-section or, as shown, square, and the stem 24c is complementarily square. Thus the stem is limited to longitudinal movement within the bore, and to move the stem forward (to the right) or reverse an eyelet is shown on the rear end thereof at 55 connected by a link 46c to one of the lower holes 56 in the rocker. The installation is similar to that shown in FIG. 13 except that, preferably, the housing may be positioned lower down, although not necessarily so. In any event, since the distance of travel of the stem 24a between its minimum and maximum through passage positions is relatively small, by engaging the link in a lower hole in the rocker, the longitudinal movement of the stem is reduced with respect to the swing of the rocker. The three holes shown extending through the stem 24c, at 19c, 20c and 21c, are equivalent to the holes or passages 19a, 20a and 21a previously described in the stem 24.

The pairs of aligned holes extending through the partition 15c, which are equivalent to the pairs of holes 19, 20 and 21 previously described, are shown at 19d, 20d and 21d, respectively. The position of the stem 24c with respect to the bore 18c, or within the bore, shown in FIG. 16 is equivalent to the starting position shown in FIG. 4, as is obvious. The direction of flow of the blow-by into the intake manifold is shown by the arrows in FIG. 16. A square ring 57 is shown on the outer end of the stem 24a and is slidable thereon, being locked into position as by means of a set screw 58. As a guide to lock the ring in a proper position for setting the stem 24c in its starting position, one or more graduations or other marks may be applied at 59 on any surface or surfaces of the stem.

That the device illustrated in FIGS. 16–18 will function in the same manner as previously described in varying the degree of opening, or the cross-sectional area, of the through passage through the valve, is believed apparent without requiring a detailed description of its operation.

What is claimed and desired to be secured by Letters Patent is as follows:

1. In an internal combustion engine having a first opening into the downdraft side of the carburetor thereof, a second opening into the valve cover thereof, an accelerator mechanism for controlling the throttle of the engine, and conduit means extending between said first and second openings for passage of gases from the crankcase into the intake manifold, said conduit means including a flow control valve having a range between a minimum through flow position and a maximum through flow position, means partly on said valve and partly on said mechanism for progressively opening said valve from substantially said minimum flow position to substantially said maximum flow position proportionally as said mechanism opens said throttle from its minimum open position at idling to its maximum open position, said valve consisting of a tubular housing having its inlet end directed toward said second opening and its outlet end directed toward said first opening, said housing having a relatively thick partition therein and a bore noncircular in cross section extending through the partition along a diameter of the housing, said partition having at least one pair of mutually aligned holes therethrough communicating with said bore, a valve stem slidably mounted in said bore and having a cross-section complementary to the cross section of said bore thereby constraining said stem against rotational movement, said stem having at least one transverse passage therethrough normally partly aligned with said two holes in the said minimum flow position of the valve and substantially fully aligned therewith in said maximum flow position.

2. In an internal combustion engine according to claim 1, said inlet end having a unitary hollow plug registering therein and including an inner end portion extending part way toward said partition, said inner end portion of said plug having an external diameter smaller than the internal diameter of said inlet end thereby providing a circumferential space around said inner end portion, said plug including a nipple extending outward from said housing, the passage through said plug having a relatively large diameter, a blocking wall on said inner end portion closing the inner extremity of said passage through the plug, said inner end portion having a plurality of radial passages through the circumferential wall thereof spaced forward of said blocking wall, the diameter of said radial passages being relatively small compared with said relatively large diameter of said passage through the plug.

3. In an internal combustion engine according to claim 1, said bore and hence said stem being rectangular in cross section, said stem being slidably mounted in said bore.

4. In an internal combustion engine according to claim 3, said stem having adjustable means thereon for positioning the stem in the minimum flow starting position thereof with respect to said bore.

5. In an internal combustion engine according to claim 4, said last-named means comprising a ring slidably mounted on one end of said stem external to said housing, and means for releasably locking said ring on the stem.

6. In an internal combustion engine according to claim 4, said means partly on said flow control valve and partly on said mechanism comprising a rocker actuated by said mechanism, said rocker having at least one hole therein, said stem having an eyelet on the end thereof opposite said one end thereof, and a link having one end pivoted in said hole in the rocker and the other end pivoted in said eyelet.

(References on following page)

References Cited

UNITED STATES PATENTS

| | | |
|---|---|---|
| 1,519,393 | 12/1924 | Broberg. |
| 1,637,941 | 8/1927 | Hunter. |
| 2,128,154 | 8/1938 | Masters. |
| 2,154,593 | 4/1939 | Way. |
| 2,166,720 | 7/1939 | Gorleski. |
| 2,255,351 | 9/1941 | Dressler. |
| 2,516,547 | 7/1950 | Carlson et al. |
| 2,681,051 | 6/1954 | Robinson. |
| 3,176,670 | 4/1965 | Sinbaldi. |

FOREIGN PATENTS

| | | |
|---|---|---|
| 384,656 | 12/1932 | Great Britain. |
| 554,416 | 3/1923 | France. |
| 999,735 | 10/1951 | France. |
| 171,473 | 11/1934 | Switzerland. |

WENDELL E. BURNS, Primary Examiner